United States Patent
Choi

(10) Patent No.: US 6,993,171 B1
(45) Date of Patent: Jan. 31, 2006

(54) COLOR SPECTRAL IMAGING

(75) Inventor: J. Richard Choi, 6900 Chelsea Rd., McLean, VA (US) 22101

(73) Assignee: J. Richard Choi, McLean, VA (US)

( * ) Notice: Subject to any disclaimer, the term of this patent is extended or adjusted under 35 U.S.C. 154(b) by 0 days.

(21) Appl. No.: 11/034,308

(22) Filed: Jan. 12, 2005

(51) Int. Cl.
*G06K 9/00* (2006.01)

(52) U.S. Cl. .......................... 382/128; 378/4; 345/597
(58) Field of Classification Search ................ 385/147; 378/4; 382/128; 345/597
See application file for complete search history.

(56) References Cited

U.S. PATENT DOCUMENTS

| | | | | |
|---|---|---|---|---|
| 5,185,809 A | * | 2/1993 | Kennedy et al. | 382/131 |
| 2002/0196965 A1 | * | 12/2002 | Wallace et al. | 382/131 |
| 2003/0095697 A1 | * | 5/2003 | Wood et al. | 382/131 |
| 2003/0103665 A1 | * | 6/2003 | Uppaluri et al. | 382/131 |

* cited by examiner

*Primary Examiner*—Sung Pak

(57) ABSTRACT

The present invention, called Color Spectral Imaging (CSI), generally pertains to a method of displaying colorized two-dimensional medical images of human anatomy. Specifically, the present invention pertains to a method of assigning predetermined range of colors to computed tomography images for enhanced visualization.

5 Claims, 5 Drawing Sheets

COLOR SPECTRAL IMAGING

CROSS-REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

The present invention generally pertains to a method of displaying colorized two-dimensional medical images of human anatomy. Specifically, the present invention pertains to a method of assigning predetermined range of colors to computed tomography images for enhanced visualization.

Medical imaging systems, such as Computed Tomography (CAT, or CT) scans, are well known in the art. CT imaging systems produce anatomical images by projecting x-ray beams through the desired portion of the human body. The x-ray beams undergo attenuation proportional to the densities of organs through which they travel. Detectors are arranged to receive the attenuated beams, and two-dimensional cross-section 'slices' are constructed by a computer, based on relative radiological densities of the internal organs and tissues.

CT densities are defined in Hounsfield Units (HU), named after the Nobel Prize winner who developed x-ray computed tomography. HU are units derived from exponents of attenuation ratios that range from −1024 to 4096 with values of −1000 for air to 0 for water, and to over 1000 for compact bones. Traditionally, CT scan images have been constructed using grayscale such that 'white' represents particles with the highest densities and 'black' represents particles with the lowest densities. Since HU may take on over 5000 distinct values, computed images must be able to incorporate over 5000 distinct shades of gray in order to accommodate the full density spectrum. This presents a serious problem in interpreting computed images, because human eyes cannot discern over 5000 distinct shades of gray. For example, an abdominal CT scan may contain dense spinal bones, which would appear 'white', surrounded by much less dense abdominal soft tissues, which would collectively appear 'blackish' or 'grayish.' With range of 5000 shades of gray, various abdominal soft tissues that share narrow range of HU values may not be distinguishable to human eyes.

In order to remedy this problem, prior art CT imaging systems utilize user-defined 'viewing window' which sets upper and lower HU threshold values displayable on the display screen. FIG. 1 shows a thoracic CT scan image with 'abdominal windows' having a window with width of 400 HU and center of 30 HU. With this setting, tissues that have Houndsfield density between 230 HU and −170 HU (range of 200 HU above and below a center value of 30) will be displayed in shades of gray. Setting the displayable threshold limits to '400 HU width/30 HU center' allows any structures with densities of 230 HU and above to appear white, and any structures with densities of −170 HU or below to appear black. Structures with densities that fall between 230 HU to −170 HU are displayed in shades of gray proportional to their relative densities within the displayable threshold limits. Thus various soft tissues that share narrower HU values may become more easily discernible in this viewing window.

Upper and lower displayable thresholds may be changed by the user (i.e. radiologist) to target specific organs or tissues for display. FIG. 2 shows the 'lung windows' with width of 1500 and center of −700 (HU threshold limits 50 to −1024), and FIG. 3 shows the 'bone windows' with width of 2000 and center of 350 (HU threshold limits 1350 to −650). As such, inspection and examination of plurality of organs and soft tissues may require plurality of viewing windows, each with different upper and lower displayable threshold values. Since multiple viewing windows must be established for each CT scan slice, radiological diagnoses which involve examination of plurality of internal organs are difficult and time consuming.

BRIEF SUMMARY OF THE INVENTION

The present invention, called Color Spectral Imaging (CSI), provides a method of displaying colorized CT scan images that obviates the need for plurality of viewing windows. The method of present invention employs a color spectrum, which comprises predetermined range of colors (e.g. black, magenta, yellow, red, cyan, blue and white, etc.) being mapped onto a computed tomography image. Each color band in the color spectrum is mapped to a distinct sub-range of radiologic density values, the sub-range being unique to each tissue type. Thus, each organ or tissue is represented with a unique color.

In the present invention, each color band in the color spectrum exhibits a range of opacity, such that 100% opacity is mapped onto the top portion of the predetermined sub-range value and the color opacity tapers down to the bottom of each sub-range. To prevent a sharp color change between different color boundaries, adjacent color bands can be smoothly blended over a short HU range with a blending filter to form a smoothly varying, continuous spectrum. Therefore, the inventive method provides for mapping of a continuously varying color spectrum onto the entire density value range of a computed image, such that each color band corresponds to sub-range density values representing distinct tissue type.

The opacity variation in the color band, and the gradual transition of colors in the color spectrum allow more precise visualization of radiologic contours of organs or tissues.

BRIEF DESCRIPTION OF THE SEVERAL VIEWS OF THE DRAWING

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
FIG. 1 shows a prior art thoracic CT scan image with 'abdominal windows' view.
Figure 2:
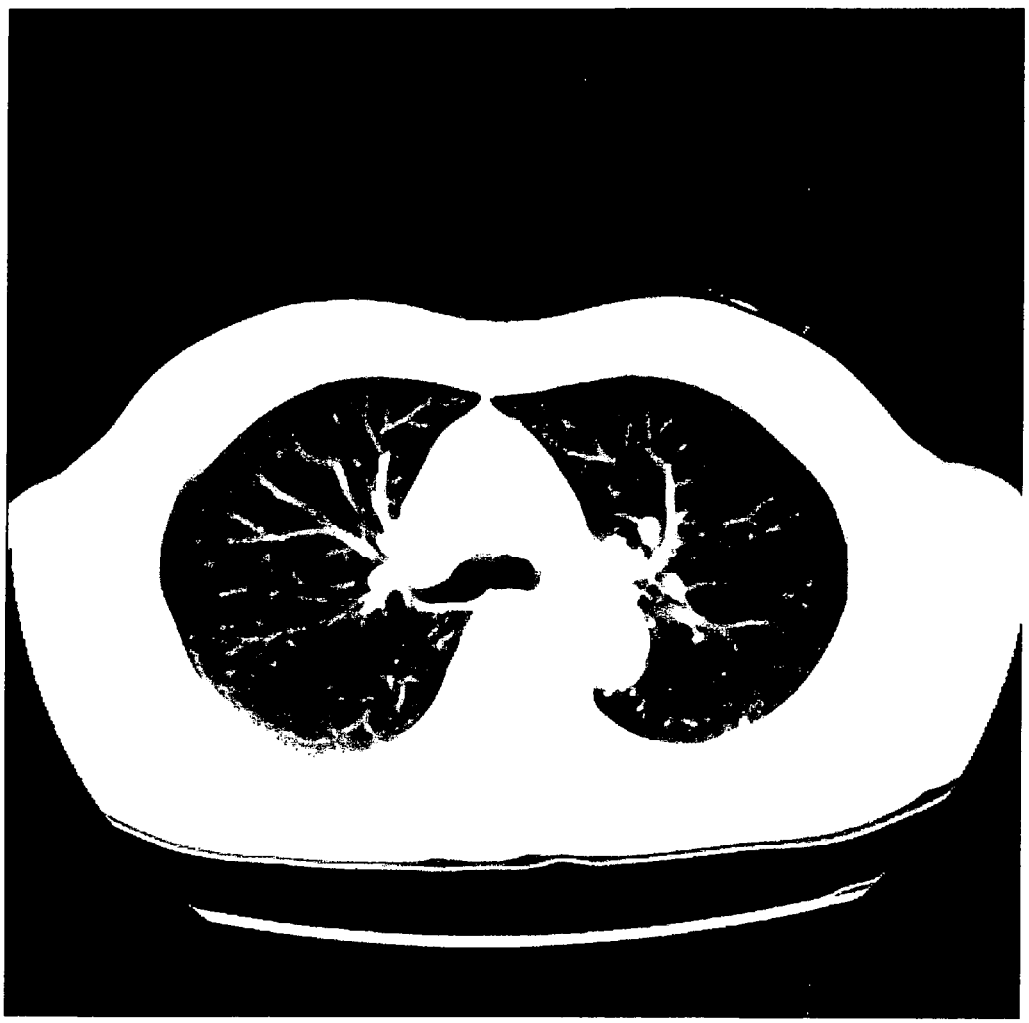
FIG. 2 shows a prior art thoracic CT scan image with 'lung windows' view.
Figure 3:
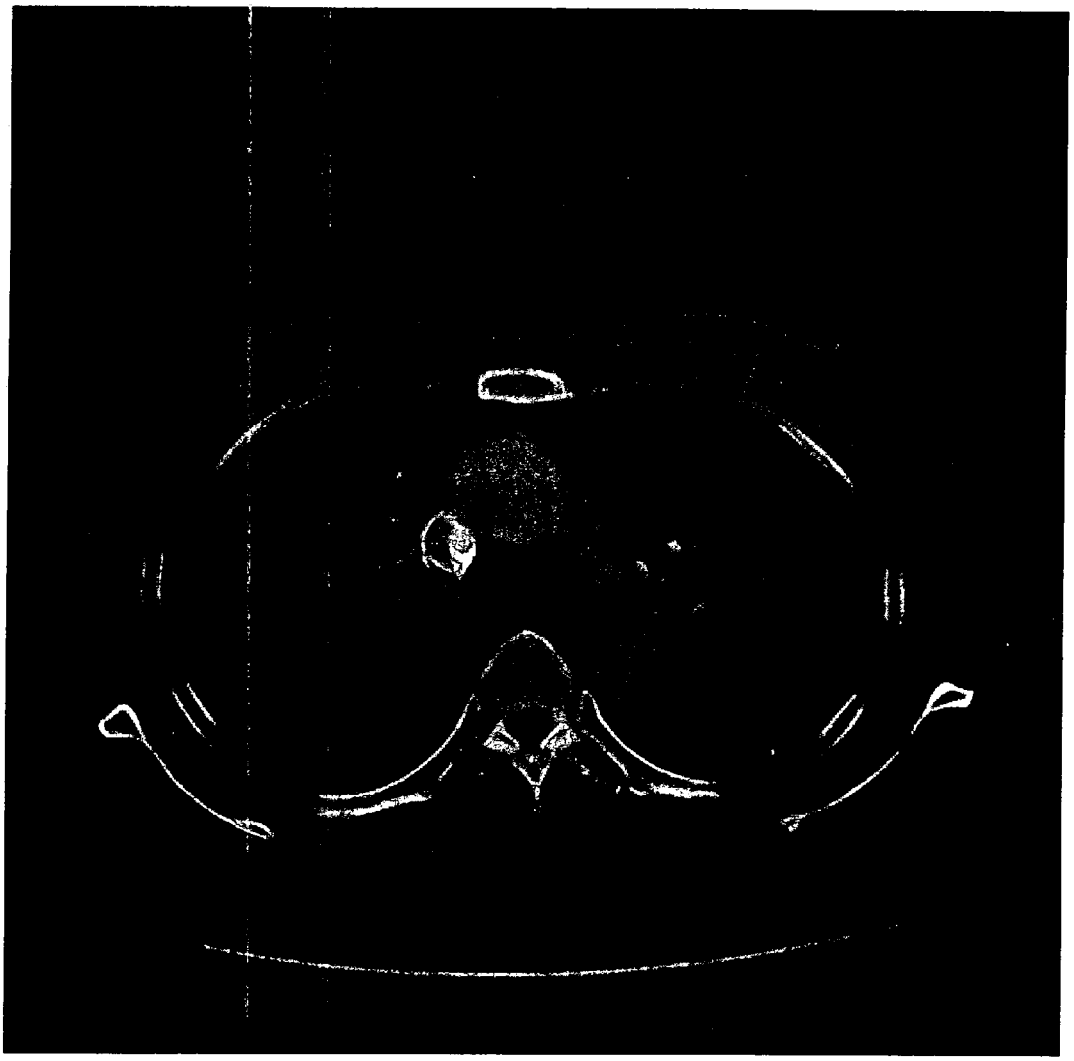
FIG. 3 shows a prior art thoracic CT scan image with 'bone windows' view.
Figure 4:
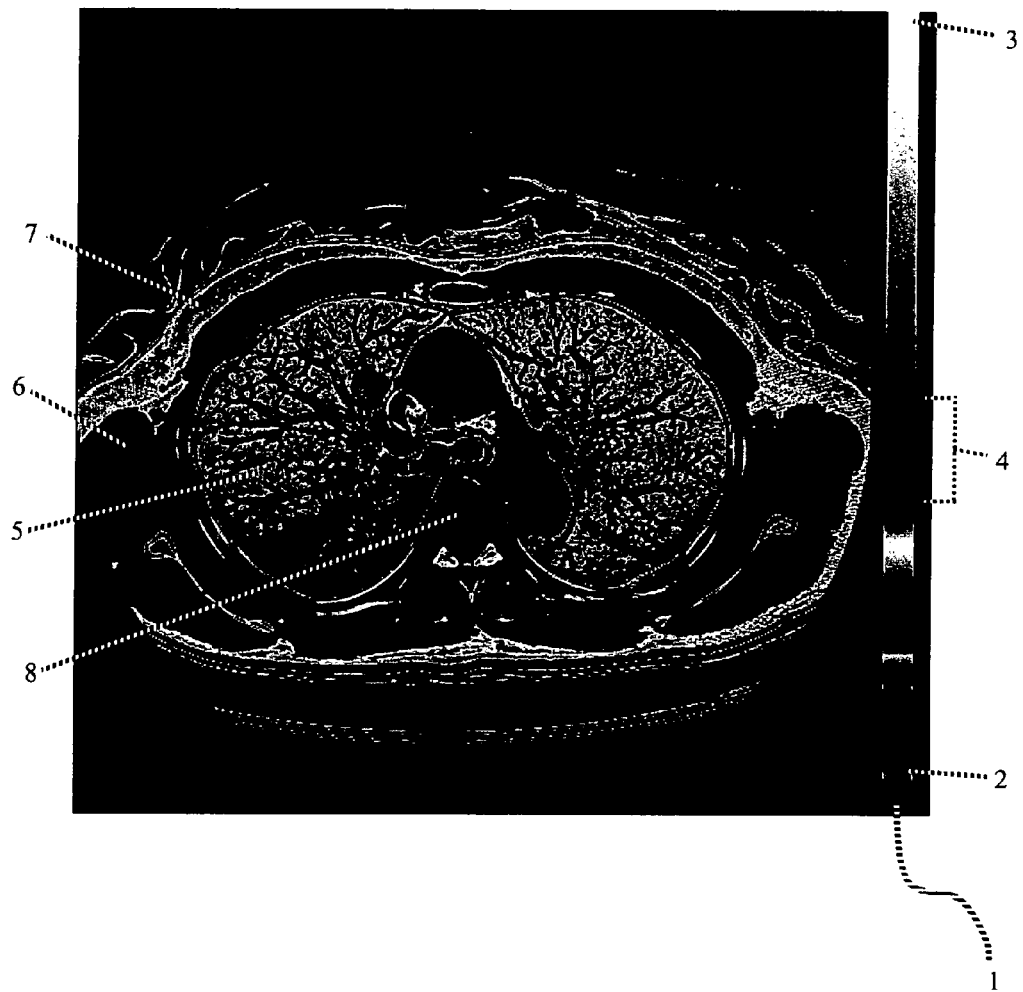
FIG. 4 shows a colorized CT scan image of the thoracic region processed by the inventive colorizing method.

FIG. 4 shows a computed tomography image that has been colorized by the inventive method. The displayed anatomical region is the same as that of FIGS. 1–3, but all the internal organs and tissues are displayed together and readily discernible through the use of colors. The method of the present invention utilizes standard two-dimensional CT scan data in DICOM (Digital Image and Communications in Medicine) format, and requires no other pre-processing. The two-dimensional DICOM scan data contains relative radiologic density values of anatomical region of interest. The present invention employs a method of mapping a color spectrum comprising plurality of color bands onto a two-dimensional CT scan data, such that a predetermined sub-range of density value is represented with a unique color band of the color spectrum.

FIG. 4 illustrates an exemplary embodiment of the color spectrum 1 displayed on the right side of the computed image. The color band on the bottom of the spectrum 2 is mapped onto the lowest radiologic density value, whereas the color band on the top of the spectrum band 3 is mapped onto the highest radiologic density value. Each color band is mapped onto a unique sub-range of density values, such that each sub-range is represented with the unique color from the spectrum. The sub-range values are predetermined, such that each sub-range corresponds to characteristic radiologic density values for each organ or tissue types. This configuration allows different organs or tissues to be represented with a unique color from the color spectrum.

Each color band 4 comprises gradually varying opacity, wherein the bottom density value (of each sub-range) is assigned a predetermined low opacity, the opacity increases to 100% toward the top portion of the sub-range, and then the color is blended to the low opacity color in the next color band. Adjacent color bands have matched opacity levels at their boundaries so that the spectrum band consists of smoothly varying and continuous color bands. This configuration provides a more precise mode of displaying radiological contours of organs and tissues in a computed tomography image. In addition, this configuration allows for more accurate representation of organ and tissue boundaries in the displayed image.

The range and number of displayable colors in the color spectrum will generally depend on the specific application. For example, FIG. 4 illustrates magenta color band assigned to density values corresponding to lungs 5, red color band assigned to density values of muscle 6, yellow color band assigned to density values of fat 7, cyan color band assigned to density values of bone 8, etc. The number of colors and the sub-range of density values to which these colors correspond are predetermined based on the need of the user (i.e. radiologist), but these parameters may be changed depending on the visualization preference. That is, there are multiple color groups that can be used for specific application. In addition to the general color spectrum that is used in chest and abdomen, as shown in FIG. 4, a slightly different color spectrum may be used for the evaluation of brain, sinus, muscular skeletal exams, etc. This is because different color spectra are optimized for different organ systems.

Figure 5:
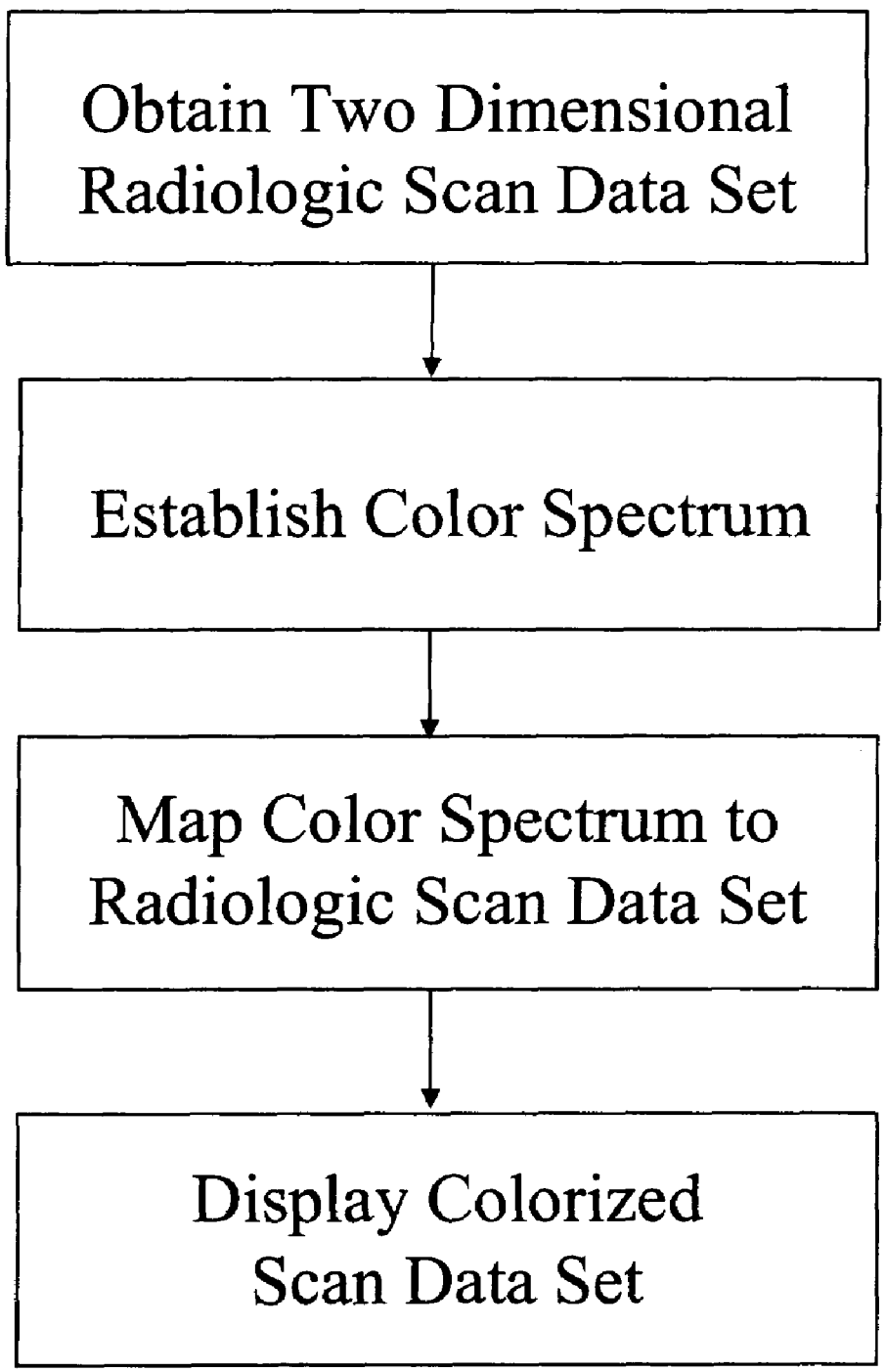
FIG. 5 is a diagram outlining the inventive steps of the present invention.

FIG. 5 summarizes and illustrates the inventive steps involved in colorizing the computed tomography image of FIG. 4.

It is to be understood that the method described herein in accordance with the present invention may be implemented in various forms of hardware, software, firmware, special purpose processors, or any combination thereof. In a preferable embodiment, the inventive method is to be implemented in software as an application comprising program instructions that are tangibly embodied on one or more program storage devices, and executable by any device or machine comprising suitable architecture.

I claim:

1. A method of colorizing a radiological medical image comprising:
 a step of obtaining a two-dimensional radiologic scan data set, wherein said radiologic scan data set contains radiologic density values of an anatomical region of interest;
 a step of establishing a color spectrum comprising plurality of color bands;
  wherein an individual color band of said plurality of color bands exhibits predetermined low opacity at the bottom of said color band, and gradually increases to 100% opacity toward the top portion of said color band, and then blended to low opacity of a next color band;
  wherein said plurality of color bands are disposed adjacent each other, so that said color spectrum contains smoothly and continuously varying colors;
 a step of mapping said color spectrum to said radiologic scan data set,
  wherein said individual color band is mapped onto a predetermined sub-range of said radiologic density values contained in said radiologic scan data set,
  wherein said predetermined sub-range corresponds to characteristic density values for different anatomical tissue types,
 a step of displaying such colorized radiologic scan data set.

2. The method of claim 1, wherein said two-dimensional radiologic scan data set is a CT scan data set.

3. The method of claim 2, wherein said CT scan data set is formatted in DICOM format.

4. The method of claim 1, wherein said plurality of color bands are specifically selected to tailor different set of organ systems.

5. The method of claim 4, wherein said organ systems comprise chest/abdomen system, and said plurality of color bands comprise black color band, magenta color band, yellow color band, red color band, cyan color band, blue color band, and white color bands.

* * * * *